Patented Feb. 26, 1924.

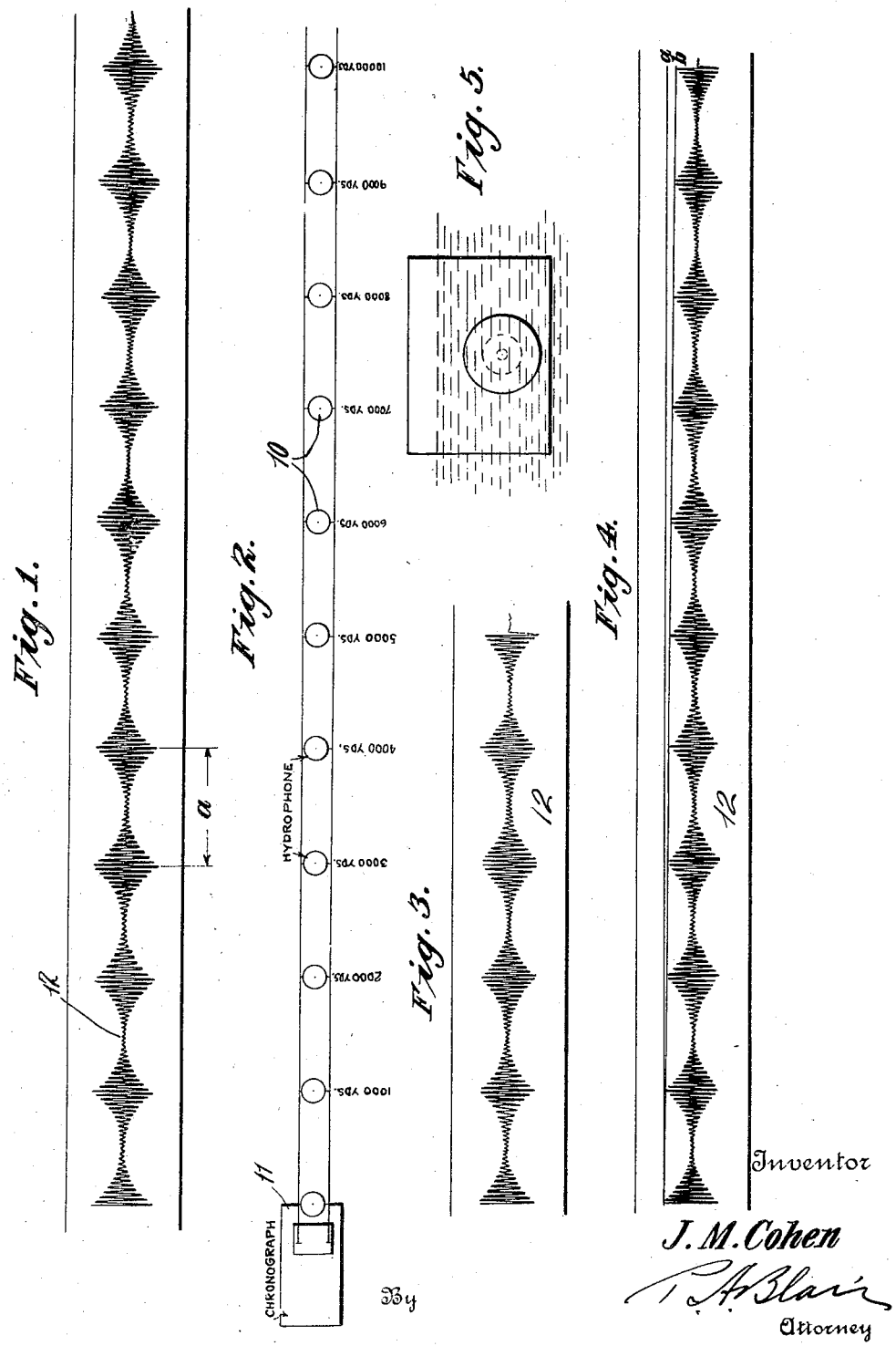

1,485,017

UNITED STATES PATENT OFFICE.

JACOB M. COHEN, OF WASHINGTON, DISTRICT OF COLUMBIA.

TORPEDO-TESTING APPARATUS.

Application filed December 19, 1919. Serial No. 346,193.

*To all whom it may concern:*

Be it known that I, JACOB MAURICE COHEN, a citizen of the United States, residing at Washington, District of Columbia, have invented new and useful Improvements in Torpedo-Testing Apparatus, of which the following is a specification.

This invention relates to a method and apparatus for measuring the speed of a torpedo.

In order that a clearer perception of the present invention may be had it may be briefly stated that the present invention is designed to be employed on torpedo ranges whereby torpedoes after being manufactured and assembled are sent for testing in order to determine the speed, accuracy and reliability of the torpedo under actual running conditions. These ranges are usually located in comparatively protected water, such, for example, as harbor or river of sufficient width and depth where the torpedo is shot towards a fixed target after making the usual calculations and allowances for tide, etc.

Heretofore at predetermined intervals, say a thousand yards apart, small boats are stationed each with a signal man who flags back to the sending station the moment the torpedo passes his point of observation and notes the approximate distance from his station at which the torpedo passed. The data obtained from these various stations sometimes as many as 18 or 20, when combined will give a fairly accurate statement of the speed and accuracy of the torpedo being tested. This system, however, is open to objections in that it cannot be used successfully or practically on foggy days or when visibility is low. Further, it requires the use or employment of a relatively large number of men under very uncomfortable and trying conditions and, third, in cases where the inaccuracy of fire or a defect of the torpedo is such as to carry it out of the range of any observation station there is strong probability that the torpedo will be lost and as these torpedoes cost upwards $10,000 each it is a serious matter.

The present invention is designed to overcome these and other objections that will hereinafter appear obvious by employing a series of hydrophones or similar instruments along the range so connected with a receiving station such as a chronograph at the sending point as to give an accurate indication of the speed of the torpedo as fired along the range.

A sheet of drawings has been annexed and forms a part of this specification with a view of showing graphically one of various forms of apparatus and the method of using the same. In this drawing, Figure 1 shows a portion of a chronograph tape upon which a record of the run is graphically drawn.

Figure 2 is a diagrammatic view showing the general lay-out of the apparatus.

Figure 3 is a view similar to Figure 1 showing the effect upon the record tape when a torpedo stops or sinks, while, Figure 4 is a view similar to Figure 1 showing the curve produced when the torpedo deflects from the true course.

Figure 5 is a detail view showing diagrammatically the suspension of a hydrophone from a float.

As herein shown, particularly in Figure 2, a plurality of hydrophones 10 are placed approximately 1000 yards apart along the range and are connected electrically in parallel or in any other desired manner with a central receiving station such as a chronograph 11 of any desired type adapted to coact with the moving film or strip 12 to record the effect of the vibrations produced on the hydrophones 10. That portion of the tape indicated by the distance "$a$" illustrates the extent of movement of the tape past the marking point while the torpedo is traversing the distance from one hydrophone to another, preferably 1000 yards. In this connection it is to be noted that the term "hydrophone" is used in its broader sense and is intended to cover any sound receiving instrument such as a megatopophone or microphone, or a sound actuated relay for example. The vibrating material should be tuned to substantially the same pitch as that of a moving torpedo. For example, an iron plate substantially 10 inches in diameter and 1 inch thick is found to be very satisfactory. This hydrophone is adapted to be secured either from a float or at the bottom of the course and connected electrically with the receiver which may be the chronograph 11. It is, of course, to be understood that these hydrophones are adjusted as nearly as possible to and substantially the same limit of vibration and give the same amplitude of vibration for equal distances between the hydrophones and the torpedo. It is realized that this is a difficult problem for the sensitiveness of the hydrophone varies with temperature and depth of water to which it is submerged. It might also be found necessary in practice to deaden these hydrophones to such an extent as to prevent overlapping of vibrations. Also it might be found impracticable to connect a relatively large number of hydrophones in parallel as herein indicated in Figure 2. The above illustrates a preferred form of assembly but it is obvious that in actual practice circumstances might require a slightly different arrangement of connections in order to prevent overlapping of the vibrations received by adjacent receivers and transmitted to the chronograph.

The tape 12 shown in Figure 3 illustrates very well the record obtained on a torpedo that stops owing to some defect in the machinery or sinks due to flooding of one of the compartments. In this case the vibration dies out and graphically indicates the point at which the engine stopped and the approximate point where the torpedo can be salvaged.

If a deflection occurs in the course of the torpedo this might be determined from the angle formed by the lines $a$—$b$ shown in Fig. 4, the line $a$ being the true course and line $b$ connecting the peaks of the vibrations.

It is thus seen that the present invention provides a simple and practical apparatus and method adapted to determine the speed of a torpedo and form an accurate record of its complete run.

Without further analysis, the foregoing will so fully reveal the gist of this invention that others can by applying current knowledge readily adapt it for various applications without omitting certain features that, from the standpoint of the prior art fairly constitute essential characteristics of the generic or specific aspects of this invention, and therefore such adaptations should and are intended to be comprehended within the meaning and range of equivalency of the following claims.

What I claim is:

1. In an apparatus of the character described, in combination, a plurality of hydrophones spaced apart under water and in a straight line substantially equal distances along a torpedo range, a chronograph with which said hydrophones are adapted to be connected, a moving tape associated with said chronograph adapted to record the vibrations successively of the hydrophones thereby to determine the speed of the torpedo and its path of travel with respect to said line of hydrophones.

2. The herein described method of measuring speed and deflection of torpedoes which consists in shooting a torpedo in a straight line along a range parallel to a series of hydrophones adapted to receive and transmit the vibrations produced by the moving torpedo to a chronograph provided with a moving tape upon which said vibrations are recorded to graphically indicate the speed and deflection of said torpedo.

Signed at Washington, District of Columbia, this tenth day of November, 1919.

JACOB M. COHEN